United States Patent [19]
Wilson

[11] Patent Number: 5,901,519
[45] Date of Patent: May 11, 1999

[54] HELICOPTER INTERIOR

[76] Inventor: Thomas Gray Wilson, 359 Rice Hill School Rd., McKee, Ky. 40447

[21] Appl. No.: 08/530,868

[22] Filed: Sep. 19, 1995

[51] Int. Cl.$^6$ ................................................ E04B 2/00
[52] U.S. Cl. ........................ 52/506.01; 52/533; 244/120
[58] Field of Search ................... 52/506.01, 302, 52/302.3, 533, 270, 284, 79.5, 518; 244/119, 120; 220/4.01, 797, 802, 803

[56] References Cited

U.S. PATENT DOCUMENTS

| | | | |
|---|---|---|---|
| 2,802,487 | 8/1957 | Breehl | 52/284 X |
| 3,852,933 | 12/1974 | Guzzo | 52/533 |
| 4,572,392 | 2/1986 | Schneider | 220/4.01 |
| 4,968,625 | 11/1990 | Smith et al. | 220/802 X |
| 5,074,093 | 12/1991 | Meadows | 52/533 X |
| 5,218,792 | 6/1993 | Cooper | 52/284 X |
| 5,293,728 | 3/1994 | Christopher et al. | 52/533 X |
| 5,305,570 | 4/1994 | Rodriguez et al. | 52/533 X |
| 5,427,266 | 6/1995 | Yun | 220/802 X |

*Primary Examiner*—Creighton Smith
*Attorney, Agent, or Firm*—Wood, Herron & Evans, L.L.P.

[57] ABSTRACT

A treatment for an aircraft interior has a plurality of panels for assembly to the interior, including side and center ceiling panels, and sidewall panels. The panels control overhead liquids and water and divert them away from the interior. The panels have features that permit them to flex and slide in relation to each other while still retaining the ability to transmit liquids from the side ceiling panels outwardly to exterior surfaces of the sidewall panels and away from the interior. The center ceiling panel has features that block liquids thereon from moving outwardly toward the side ceiling panels, and features that transmit such liquids rearwardly and away from the aircraft interior.

18 Claims, 2 Drawing Sheets

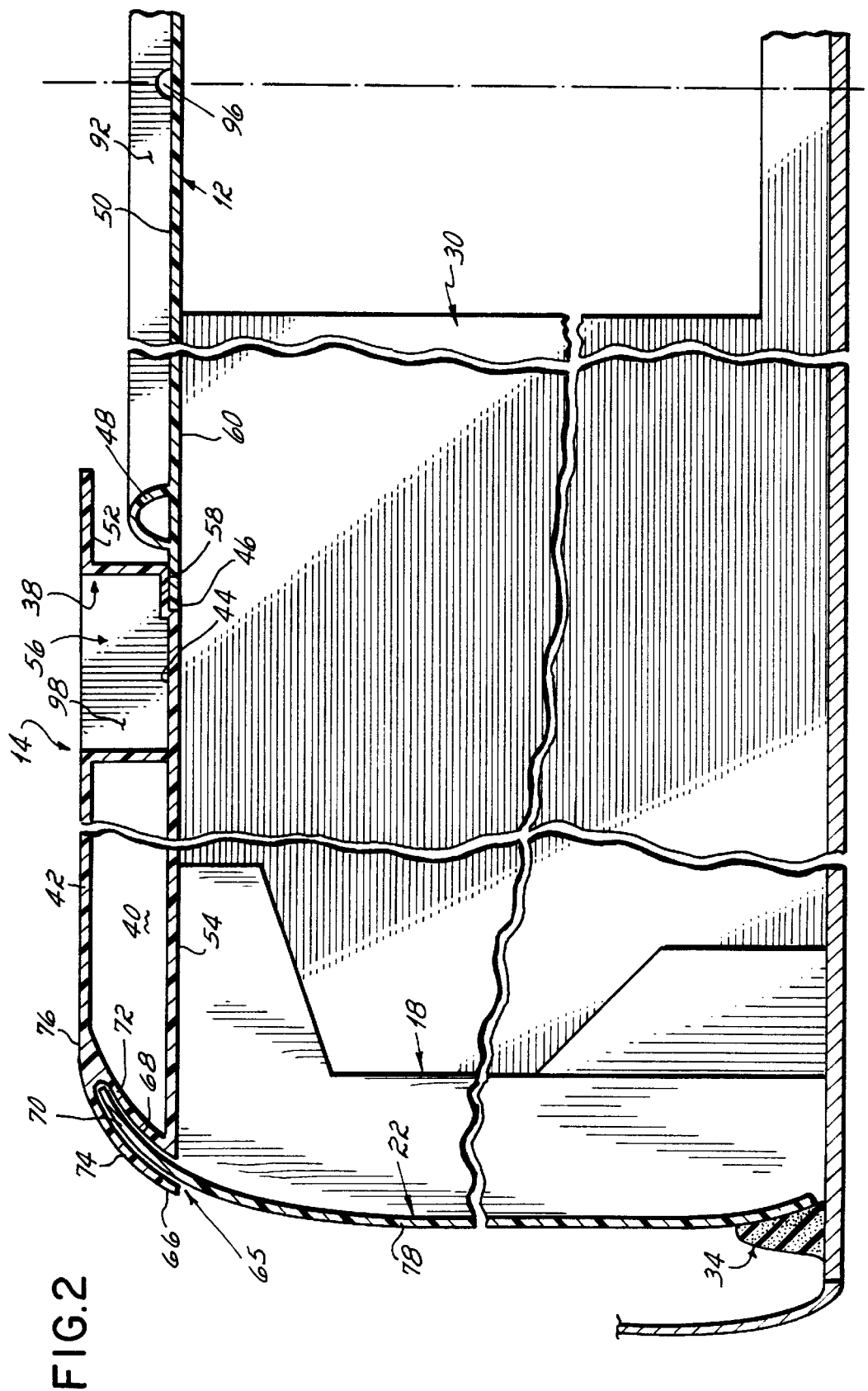

HELICOPTER INTERIOR

FIELD OF THE INVENTION

This invention relates to vehicle and aircraft interior cabin treatments. More particularly, this invention relates to the interior refurbishment of a Blackhawk helicopter in order to improve the appearance and comfort of the cabin and to protect against the intrusion into the cabin of liquids such as water, helicopter engine and gearbox lubricants, and hydraulic fluids.

BACKGROUND INFORMATION

Blackhawk helicopters have traditionally been used principally for military purposes. The Blackhawk has a large cabin suitable for transporting soldiers and cargo, and hence is a versatile aircraft for use in warfare. As is true of many helicopters, the Blackhawk's cabin is located directly beneath the engines, gearbox, and main rotor of the helicopter. In addition to containing the engines and gearbox, the area above the cabin also contains numerous hydraulically activated devices.

Experience has shown that this engine/gearbox area may leak various fluids such as lubricants, water, and hydraulic fluid. In the Blackhawk's primary military uses, such leaks do not pose much of a problem because the cabin interior is typically unfinished, and hence dripping fluids do no damage. However, the Blackhawk has other potential uses in which it is desirable to eliminate to as great an extent as possible the intrusion of fluids into the cabin area.

For example, it is desirable to use a Blackhawk helicopter to transport persons, such as military officers, in non-warfare situations. In such uses, it may be desirable to finish the cabin interior in a manner similar to the interior of a civilian or commercial aircraft, in order to provide a greater degree of comfort than the unfinished cabin affords. In particular, it may be desirable to install upholstered seating, carpeting and the like.

In such a case, it is desirable to prevent the leaking of fluids into the cabin because the materials used in finishing the interior may be damaged by contact with lubricants, fuels, or hydraulic fluids. Thus, it is desirable to refurbish the unfinished cabin of such a helicopter to provide a substantial degree of protection against fluids entering the finished interior and to provide a finer grade interior than that used for military field application.

A number of considerations limit the available alternatives for solving this problem. First, the cabin treatment must be capable of withstanding relative movement between various parts of the cabin caused by the flexing of the aircraft structure under the loads experienced in flight and on the ground. Such flexing can tear or crack fixtures mounted to the cabin wall structure. Second, because the ceiling of the Blackhawk cabin is low to begin with, it is desirable to maximize the ceiling height with the treatment installed.

Third, all parts of the treatment must be capable of passing through the side doors of the Blackhawk because the cabin treatment is preferably installed after the manufacturing of the helicopter is completed.

Fourth, because the treatment or furnishing must be removed in order to allow regular periodic maintenance to be performed on the engine/gearbox area and other areas such as the side areas housing the flight controlling rods etc., it is desirable to minimize the time required for disassembly and assembly.

Finally, the treatment must be readily adaptable to minor variations in cabin dimensions from one aircraft to another, as all aircraft, including Blackhawks, are built by hand and no two are exactly alike.

It has thus been a primary objective of the invention to provide an improved apparatus for refurbishing aircraft interiors to meet one or more of these considerations.

SUMMARY OF THE INVENTION

To these ends, the present invention is directed to a cabin treatment kit for an aircraft that provides a base for the attachment of fabrics and other finishing materials and further provides a substantial degree of protection against intrusion of fluids while meeting the foregoing requirements of cabin structure flexibility, ceiling height, door accessibility, disassembly time, and adaptability. A cabin treatment kit having features of the present invention comprises a plurality of panels that attach to the cabin-defining structure of the aircraft. The panels thus combine to define an interior cabin shell that serves as a base upon which interior finishing materials are mounted. The panels are oriented with respect to one another in such a way that liquids falling on the outer surfaces of the panels are prevented from entering the cabin and are instead directed, with the aid of gravity, toward and through drain holes; and from such drain holes, the liquids are directed around and away from the cabin interior.

In an embodiment of the invention, such a cabin treatment kit comprises a center ceiling panel, two side ceiling panels that are partially slidingly overlapped by the center ceiling panel, forward, center, and aft sidewall panels that engage the side ceiling panels, a front wall panel that engages the three ceiling panels and the forward sidewall panels, and a rear wall panel that engages the three ceiling panels and the aft sidewall panels.

The center ceiling panel and side ceiling panels have features that prevent fluids on the upper surfaces of such panels from flowing in a transverse direction toward the lap joints between the center and side ceiling panels. Fluids are thereby prevented from migrating between the overlapping portions of the center and side ceiling panels into the cabin interior. Such features may comprise protuberances on the upper surface of the center ceiling panel in the regions where the center panel overlaps the two side ceiling panels, and corresponding stepped regions on the side ceiling panels that receive such protuberances.

Preferably, the protuberances on the upper surface of the center ceiling panel are ribs that also serve to provide increased bending stiffness of the panel. The ribs are of sufficient height to prevent fluids from flowing transversely over the ribs under all normal flight conditions and aircraft attitudes. Thus, fluids coming into contact with the upper surface of the center ceiling panel in the region between the ribs are confined to remain in that region, although they may migrate forward and aft when the aircraft pitches nose-down or nose-up, respectively. Fluids in this region are drained at both the forward and the aft edges of the center ceiling panel. At the aft edge, fluids are drained by means of a lip extending downward from the upper surface of the panel; fluids flow from the upper surface, over the aft edge and down the lip, from which point they fall to the floor of the cabin outside of the cabin treatment. At the forward edge of the panel, fluids are confined by a transverse-running dam that extends upward from the upper surface of the panel; the dam has an opening attached to a drain tube that leads overboard.

In a preferred embodiment of the invention, each side ceiling panel has a longitudinally running air duct adjacent to the outboard-most longitudinal edge of the panel. The air duct is formed by securing a suitably shaped layer of panel material to the upper surface of the panel such that this layer of panel material forms the upper wall of the duct and the panel forms the lower wall of the duct. Contained between the air duct and the stepped region that overlaps the center panel rib is a channel that accommodates cables and lights running along the ceiling of the cabin. The aft edge of each side ceiling panel has a lip extending downward from the upper surface of the panel in the region of this cable channel; thus, fluids falling into the cable channel are drained overboard at the aft edge in the same way as with the center ceiling panel. At the forward edge of the cable channel, a dam extending upward from the upper surface of the panel prevents fluids from spilling over the forward edge. No drain is needed at this dam because the cable channel's location is such that little fluid is encountered in normal conditions, and hence any fluids that might accumulate in the channel are easily contained by the dam.

The height of the stepped region of each side ceiling panel, which forms one wall of the cable channel, is substantially equal to the height of the corresponding rib on the center ceiling panel. Thus, any fluids in the cable channel are prevented under normal conditions from flowing transversely over the step.

An important feature of the present invention is the joint between each side ceiling panel and the adjacent center and aft sidewall panels. In a preferred embodiment, this joint is a slip joint comprising a slot along the longitudinal edge of the side ceiling panel, which slot receives the upper longitudinal edges of the adjacent center and aft sidewall panels. The slot is formed by extending in an outboard direction the layer that comprises the upper wall of the air duct such that it slopes downward toward its outboard edge; the portion of the side ceiling panel that forms the lower wall of the air duct is turned up near its outboard edge such that it forms a V-shape, with the upper leg of the V attached at its uppermost edge to the upper wall of the duct such that there is a slot between the upper leg of the V and the upper wall. The extension of the upper wall is of sufficient transverse extent that fluids flowing along the upper surface of the upper wall of the air duct in the outboard direction flow down the extension, roll off the edge, and are unable to migrate into the slot. Thus, the fluids are prevented from contacting any fabric or other finishing material that may be secured to the inner surfaces of the sidewall panels.

In a preferred embodiment of the invention, fluids flowing off the edge of the extension fall onto the outer surfaces of the sidewall panels. From the outer surfaces of the sidewall panels, the fluids flow downward to drain holes on the floor of the cabin outside the cabin treatment. The fluids are prevented from migrating under the bottom edge of the sidewall panels by means of an elastomeric seal adhered to the floor of the cabin outboard of the sidewall panels. This seal is formed against but not bonded to the outer surface of the sidewall panels so that it fits snugly against the panels when they are installed, but permits disassembly without disturbing the seal.

The slip joint has several advantages in addition to its fluid-handling capabilities. First, because the sidewall panels are not secured to the side ceiling panels but are free to move within the slots, the cabin treatment is readily adaptable to cabins having slightly different ceiling heights. Second, the joint permits relative movements between the ceiling and walls of the cabin, such as are encountered as the cabin-defining structure of the aircraft flexes during ground and air operations, without damage to the cabin treatment panels. Third, because no attachment hardware is needed at the joint, assembly and disassembly times are reduced. In the event of a downward force on the air duct from a hard landing or flight maneuver, the sidewall panels provide adequate support for the duct.

BRIEF DESCRIPTION OF THE DRAWINGS

These and other features and advantages of the invention will become more readily apparent from the following description of a preferred embodiment, taken in conjunction with the drawings in which:

FIG. 2 is a partial cross-sectional view of the left side of an assembled treatment kit illustrating the lap joint between the center ceiling panel and an adjacent side ceiling panel, the slip joint between the side ceiling panel and the corresponding center sidewall panel, and the elastomeric seal and drain holes on the floor of the cabin outboard of the center sidewall panel.

DESCRIPTION OF THE PREFERRED EMBODIMENTS

Figure 1:
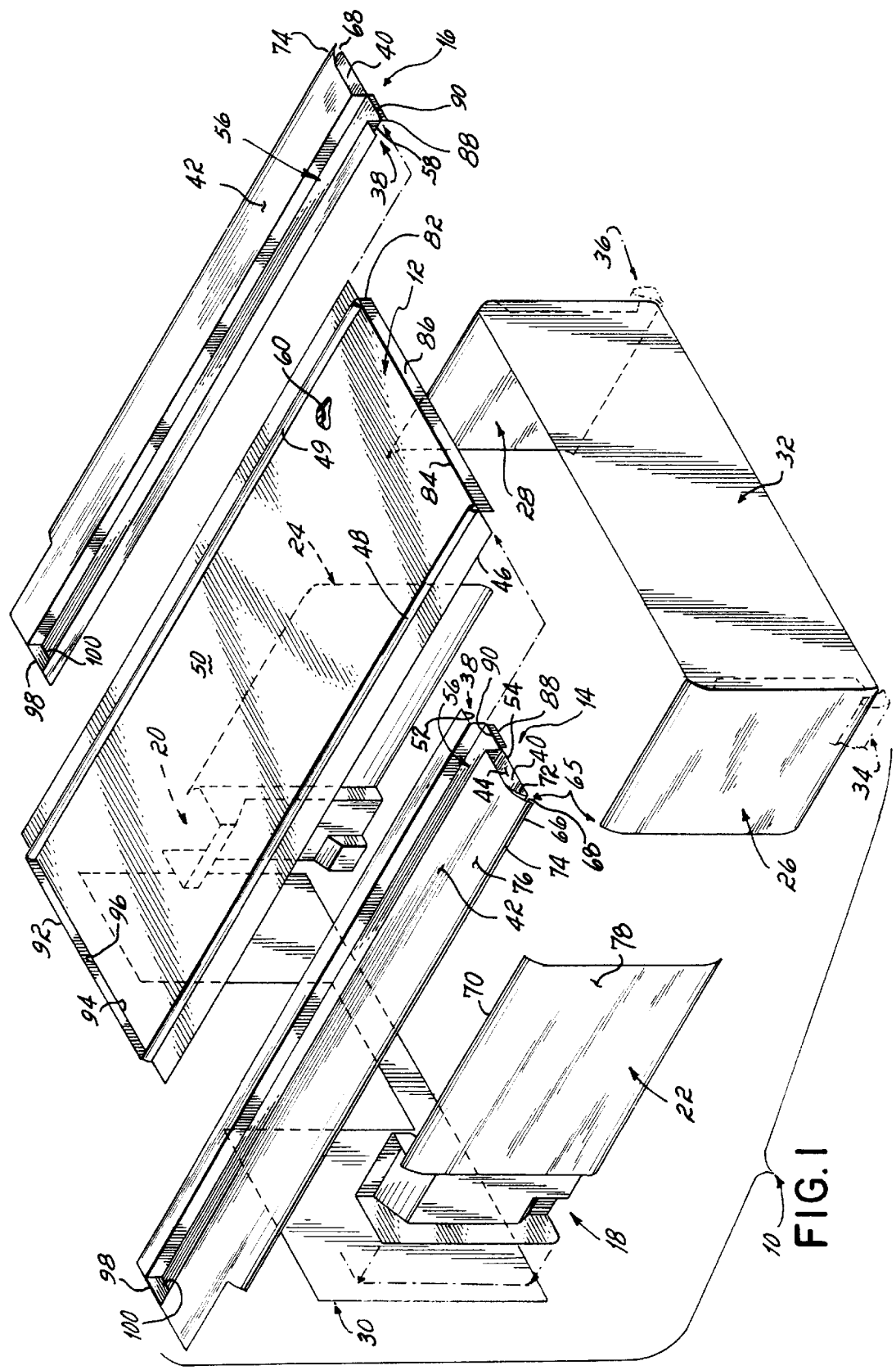
FIG. 1 is an exploded perspective view showing how the panels fit together when the treatment is installed.

As shown in FIG. 1, a cabin treatment kit 10 comprises a center ceiling panel 12, side ceiling panels 14 and 16, forward sidewall panels 18 and 20, center sidewall panels 22 and 24, aft sidewall panels 26 and 28, a front wall panel 30, a rear wall panel 32, and elastomeric seals 34 and 36.

Referring to FIG. 2, first side ceiling panel 14 has a stepped region 38 that is overlapped by center ceiling panel 12, and further has an air duct 40 formed from an upper wall 42 secured to the upper surface 44 of first side ceiling panel 14. Although FIG. 2 shows only the lap joint between the center ceiling panel 12 and first side ceiling panel 14, it is to be understood that the ceiling panels are symmetric about a longitudinal centerline of the aircraft, such that second side ceiling panel 16 is the mirror image of first side ceiling panel 14, and thus the lap joint between center ceiling panel 12 and second side ceiling panel 16 is the mirror image of the lap joint between center ceiling panel 12 and first side ceiling panel 14. Throughout this description, features prefaced by the word "first" are located left of the aircraft longitudinal centerline viewed from aft looking forward; it is to be understood that any feature so described has a "second" counterpart on the right side of the longitudinal centerline, such "second" feature being a mirror image of the "first" feature. For the sake of brevity, however, only details of "first" features are shown in the drawings.

Center ceiling panel 12 has a first longitudinal edge 46 and a first protuberance 48 on an upper surface 50. In a preferred embodiment, the first protuberance 48 serves both as a stiffener for center ceiling panel 12 and as a means for preventing transverse flow along the upper surface 50 toward the first longitudinal edge 46. The relative heights of the stepped region 38 and protuberance 48 are such that when center ceiling panel 12 is in overlapping engagement with side ceiling panel 14, there is a small clearance between the protuberance 48 and the lower surface 52 of the stepped region 38. The vertical distance between the lower surface 54 of side ceiling panel 14 and the lower surface 52 of stepped region 38 is selected to provide adequate depth for the cable channel 56 and to assure that fluids cannot flow transversely over stepped region 38 in normal flight conditions. The vertical distance between the lower surface 58 of stepped region 38 and the lower surface 54 of side ceiling panel 14 is substantially equal to the thickness of center ceiling panel 12, such that when installed, lower surface 58 contacts upper surface 50, and lower surface 54 is flush with the lower surface 60 of center ceiling panel 12.

As shown in FIG. 2, side ceiling panel 14 is secured to one of the main beams of the aircraft by means of fasteners (not shown). Center ceiling panel 12 is then secured to side ceiling panel 14 with fasteners (not shown). Elastomeric sealants (not shown) may be employed with these fasteners in order to waterproof those connections.

Also shown in FIG. 2 is the slip joint 65 formed by the engagement of first side ceiling panel 14 with first center and aft sidewall panels 22 and 26. First side ceiling panel 14 has along its outboard-most longitudinal edge 66 a slot 68 for receiving an upper edge 70 of first center sidewall panel 22. Slot 68 is formed by securing the upturned portion 72 of side ceiling panel 14 to the extension 74 of the upper wall 42 of the air duct 40. Portion 72 is shaped so as to provide a width of the slot 68 sufficient to securely contain the upper edge 70 while permitting center sidewall panel 22 to freely move within slot 68 when the aircraft flexes in use. Extension 74 is sloped downward toward its outboard edge and is of sufficient transverse extent that fluids flowing transversely along the upper surface 76 of upper wall 42 will roll off extension 74 with the aid of gravity, and will not be able to migrate up into slot 68. Fluids then flow down the outer surface 78 of center sidewall panel 22.

It is to be understood that the aft sidewall panels 26 and 28, although not shown in FIG.2, are engaged at their upper edges with the side ceiling panels 14 and 16 in the same way as the center sidewall panels 22 and 24.

As shown in FIG.2, fluids flowing down outer surface 78 are prevented from migrating underneath first center sidewall panel 22 by means of a first elastomeric seal 34 adhered to the floor of the helicopter cabin. Elastomeric seal 34 is formed against center sidewall panel 22, but is not bonded to the panel 22 in order to permit the panel 22 to be removed without disturbing the seal 34. A tight seal between the panel 22 and the seal 34 is achieved by applying the uncured elastomeric sealant material to the floor of the cabin at a location slightly inboard of where the bottom of panel 22 is located when installed. Panel 22 is then installed; in the process, the bottom of panel 22 is pushed in an outboard direction against the uncured elastomeric material, causing the material to conform to the shape of panel 22. The material is then allowed to cure; a release agent applied to panel 22 prevents the material from adhering to the panel. The resulting seal 34 is in precisely the correct position and has the proper shape to fit snugly against panel 22. Liquids flowing down the outer surface 78 are thus effectively directed to remain outboard of panel 22 on the floor of the cabin, from which point they are drained by means of holes (not shown) drilled in the floor.

As shown in FIG. 2, panel 22 has a foot (not shown) bonded to a lower edge of panel 22. The foot in turn is secured to the cabin floor by means of fasteners (not shown). The foot affords the advantage of allowing for slight cabin ceiling height variations, because it is not bonded to panel 22 until after panel 22 is installed; the amount of overlap between panel 22 and the foot is varied depending on the ceiling height.

Referring to FIG. 1, center ceiling panel 12 has a drainage lip 82 at the aft edge 84 between the first protuberance 48 and the second protuberance 49. Drainage lip 82 extends from the upper surface 50 and permits fluids on upper surface 50 to flow down along the surface 86 with the aid of gravity; the fluids then fall to the floor of the cabin outboard of rear wall panel 32, where they flow into drain holes (not shown) drilled in the floor. Similarly, fluids on the upper surface 44 of side ceiling panel 14 within the cable channel 56 are drained at the aft edge 90 by means of a drainage lip 88.

The center ceiling panel 12 has a dam 92 extending upward from the upper surface 50 between protuberances 48 and 49 to prevent fluids from flowing forward over the edge 94. Dam 92 has an opening 96 into which fluids may flow. Opening 96 is made to accommodate a drain tube (not shown). Side ceiling panel 14 has a dam 98 in the cable channel 56 to prevent fluids from flowing forward over the edge 100. No drain is needed at this location because the dam 98 is of sufficient height to contain what little fluids might collect in the cable channel 56.

In a preferred embodiment of the invention, all of the panels are constructed of a resin and glass fiber composite material. Such material has a relatively high strength-to-weight ratio, is waterproof, and is not harmed by contact with lubricants and other fluids typically encountered in use. However, those skilled in the art will readily appreciate that other materials may be used, such as plastics or graphite composite, without impairing the advantages of the invention.

It will be appreciated that the invention thus provides a unique treatment for an aircraft interior. The panels control overhead liquids and water and divert them away from the interior, yet flex and slide with respect to each other accommodating aircraft structural flexing and vibration. Since the peripheral adjacent portions of the respective panels transmit liquids over the joints between the panels, but still slide with respect to each other, liquid cannot intrude into the aircraft interior while, at the same time, the panel material does not stress, crack, break, fatigue, or otherwise fail due to aircraft frame flex. The panels are preferably covered on their interior surfaces with upholstery, even in fine grade fabrics and leathers, and may also be provided with sound deadening material for sound insulation.

Although a preferred embodiment of the invention has been described, those skilled in the art will recognize that modifications may be made to various aspects of the embodiment, without departing from the spirit and scope of the invention.

What is claimed is:

1. A cabin treatment kit for protecting against intrusion of fluids into an aircraft cabin, the kit comprising:

a center ceiling panel having first and second longitudinal edges;

a first side ceiling panel overlappingly engaging said first longitudinal edge of said center ceiling panel;

a second side ceiling panel overlappingly engaging said second longitudinal edge of said center ceiling panel;

first and second forward sidewall panels engaging said first and second side ceiling panels, respectively;

first and second center sidewall panels engaging said first and second side ceiling panels, respectively;

first and second aft sidewall panels engaging said first and second side ceiling panels, respectively;

a front wall panel engaging said center ceiling panel, side ceiling panels, and forward sidewall panels; and a rear wall panel engaging said center ceiling panel, side ceiling panels and aft sidewall panels.

2. The kit of claim 1 wherein said center ceiling panel has on an upper surface thereof means for preventing transverse flow of fluids along said upper surface to said longitudinal edges.

3. The kit of claim 2 wherein each said side ceiling panel has a stepped region adjacent to said center ceiling panel such that a lower surface of said stepped region contacts an upper surface of said center ceiling panel.

4. The kit of claim 3 wherein said means for preventing transverse flow comprises a protuberance of said upper surface of said center ceiling panel.

5. The kit of claim 4 wherein each said side ceiling panel has a longitudinal air duct adjacent to an outboard-most longitudinal edge of said side ceiling panel, said air duct comprising an upper wall secured to an upper surface of said side ceiling panel.

6. The kit of claim 5 wherein each said side ceiling panel has along said outboard-most longitudinal edge a slot, said slot having a width such that said center and aft sidewall panels engaged therein may freely move within said slot.

7. The kit of claim 6 wherein said slot is formed by securing an upturned portion of said side ceiling panel to an extension of said upper wall of said air duct, said extension of said upper wall being shaped and of sufficient transverse extent to prevent fluids flowing transversely on an upper surface of said upper wall toward said extension from migrating into said slot.

8. The kit of claim 7 wherein said center ceiling panel has a drainage lip extending downward from an aft edge of said center ceiling panel to permit fluids flowing aft along an upper surface of said center ceiling panel to flow down said drainage lip and fall from said drainage lip to a point outboard of said rear wall panel, said center ceiling panel further having a dam extending upward from an upper surface of said center ceiling panel adjacent to a forward edge of said center ceiling panel between said protuberances, said dam having an opening for accommodating a drain tube, said opening being located such that fluids that collect on said upper surface of said center ceiling panel between said protuberances may flow into said opening and be drained overboard.

9. The kit of claim 8 wherein each said side ceiling panel has a cable channel lip extending downward from an aft edge of said side ceiling panel between said air duct and said stepped region to permit fluids to flow down said cable channel lip and fall to a point outboard of said rear wall panel, each said side ceiling panel further having a cable channel dam extending upward from a forward edge of said side ceiling panel between said air duct and said stepped region.

10. The kit of claim 9, wherein said cabin has a floor and further comprising first and second elastomeric seals adapted to be adhered to the floor of said cabin outboard of said first and second center sidewall panels and said first and second aft sidewall panels, respectively, said elastomeric seals being formed against but not bonded to said center and aft sidewall panels.

11. The kit of claim 1 wherein each said side ceiling panel has along an outboard-most longitudinal edge a slot, said slot having a width such that said center and aft sidewall panels engaged therein may freely move within said slot.

12. An aircraft having an interior with ceiling and side structure defined by a plurality of panels comprising:

ceiling and sidewall panels;

said panels being attached respectively to ceiling and side structure of the interior of said aircraft;

said ceiling and sidewall panels oriented with respect to each other to pass liquids from an upper surface of said ceiling panels to and along outer surfaces of said sidewall panels and away from said interior; and said ceiling and sidewall panels being oriented with respective peripheral portions of each being slidable with respect to each other to accommodate flex in said aircraft without stressing any of said panels to material failure.

13. In combination, a ceiling panel and a sidewall panel defining an interior ceiling and a sidewall in an aircraft and preventing liquids from intruding into an interior of said aircraft, wherein said sidewall panel includes an elongated upper edge, and wherein said ceiling panel includes an elongated side edge movably interconnected with the upper edge of said sidewall panel, said ceiling panel side edge including two opposed members defining an elongated space, said upper edge of said sidewall panel being movably disposed between said two members in said elongated space when said panels are assembled together in an aircraft, said two members and said upper edge having shapes conforming to each other.

14. Apparatus as in claim 13 wherein one of said members overlaps said upper edge such that fluids on said ceiling panel run over said one member and down an exterior surface of said sidewall panel.

15. Apparatus as in claim 14 wherein said ceiling panel and said sidewall panel may freely flex and move in relation to each other as the aircraft flexes in operation.

16. A method of controlling overhead liquids and water in an aircraft and for diverting same away from an aircraft interior including the steps of:

catching liquids leaking from aircraft components, on at least side and center ceiling panels;

transmitting such liquids from said side ceiling panel outwardly to exterior surfaces of a sidewall panel;

transmitting liquids from said side ceiling panel down said exterior surfaces of said sidewall panel without leaking between said ceiling panel and said sidewall panel into said interior;

blocking liquids on a center ceiling panel from moving outwardly toward said side ceiling panels; and transmitting liquids on said center ceiling panel rearwardly and away from said interior.

17. An interior panel kit for use in an interior cabin of a helicopter including a cabin defining structure susceptible to flexing during operation of the helicopter, said kit comprising:

a plurality of interior panels for attachment to an interior cabin defining structure of the helicopter;

said panels being adapted to be attached to said interior cabin defining structure to define an interior cabin shell including separate ceiling and side members with at least some of the panels overlapping each other;

at least some panels having liquid directing surfaces for channeling liquid longitudinally along said panels outside said interior cabin shell;

at least some ceiling member panels overlapping adjacent side member panels for directing liquid outside said side member panels; and at least some of said panels being adapted to be mounted on said interior cabin defining structure in longitudinal slidable relation to adjacent panels after assembly together such that they are respectively movable independently of each other upon flexing of said interior cabin defining structure during operation of said helicopter while maintaining operable the surfaces for channeling liquids outside the cabin shell.

18. In a helicopter having a cabin, an interior panel kit comprising:

a ceiling panel having an elongated edge defined by two opposed members and a side panel having an upper edge disposed in sliding relation between said two opposed members when said panels are assembled together in said helicopter, said ceiling panel lying substantially in a horizontally extending plane and said side panel disposed in a substantially vertically extending plane.

* * * * *